US008643631B2

(12) United States Patent
Choi et al.

(10) Patent No.: US 8,643,631 B2

(45) Date of Patent: Feb. 4, 2014

(54) ORGANIC LIGHT EMITTING DISPLAY AND METHOD OF DRIVING THE SAME

(75) Inventors: Sang-Moo Choi, Yongin (KR); Keum-Nam Kim, Yongin (KR); Kyung-Hoon Chung, Yongin (KR)

(73) Assignee: Samsung Display Co., Ltd., Yongin-si (KR)

(*) Notice: Subject to any disclaimer, the term of this patent is extended or adjusted under 35 U.S.C. 154(b) by 478 days.

(21) Appl. No.: 13/016,857

(22) Filed: Jan. 28, 2011

(65) Prior Publication Data

US 2012/0050233 A1 Mar. 1, 2012

(30) Foreign Application Priority Data

Aug. 31, 2010 (KR) ........................ 10-2010-0084702

(51) Int. Cl.
*G06F 3/038* (2013.01)
*G09G 5/00* (2006.01)

(52) U.S. Cl.
USPC ............. 345/204; 345/76; 345/82; 315/169.1

(58) Field of Classification Search
USPC ................. 345/76–83, 204; 315/169.1–169.4
See application file for complete search history.

(56) References Cited

U.S. PATENT DOCUMENTS

| | | | | |
|---|---|---|---|---|
| 2008/0111837 A1* | 5/2008 | Kim et al. | ..................... | 345/690 |
| 2008/0150846 A1* | 6/2008 | Chung | ............................ | 345/80 |
| 2008/0246701 A1* | 10/2008 | Park et al. | ....................... | 345/77 |
| 2009/0027315 A1* | 1/2009 | Kim et al. | ....................... | 345/76 |
| 2009/0147032 A1* | 6/2009 | Kim | .............................. | 345/690 |

FOREIGN PATENT DOCUMENTS

| | | |
|---|---|---|
| KR | 10-0306695 | 8/2001 |
| KR | 10-2008-0066504 | 7/2008 |
| KR | 10-2009-0123896 | 12/2009 |

* cited by examiner

*Primary Examiner* — Kimnhung Nguyen

(74) *Attorney, Agent, or Firm* — Christie, Parker & Hale, LLP

(57) ABSTRACT

There is provided a method of driving an organic light emitting display so that the organic light emitting display may be driven at a low driving frequency. The organic light emitting display includes pixels coupled to odd and even scan lines. The organic light emitting display is driven during frames. Each of the frames includes first, second, third, and fourth frame periods. The method includes: sequentially supplying scan signals to the odd scan lines in the first and third frame periods; and sequentially supplying scan signals to the even scan lines in the second and fourth frame periods. The pixels are in a non-emission state in the first and third frame periods.

19 Claims, 7 Drawing Sheets

ORGANIC LIGHT EMITTING DISPLAY AND METHOD OF DRIVING THE SAME

CROSS-REFERENCE TO RELATED APPLICATION

This application claims priority to and the benefit of Korean Patent Application No. 10-2010-0084702, filed on Aug. 31, 2010, in the Korean Intellectual Property Office, the entire content of which is incorporated herein by reference.

BACKGROUND

1. Field

Aspects of embodiments according to the present invention relate to an organic light emitting display and a method of driving the same.

2. Description of Related Art

Recently, various flat panel displays (FPDs) with reduced weight and volume when compared to that of cathode ray tube (CRT) devices have been developed. The FPDs include liquid crystal displays (LCDs), field emission displays (FEDs), plasma display panels (PDPs), and organic light emitting displays.

Among the FPDs, the organic light emitting displays display images using organic light emitting diodes (OLEDs) that generate light by re-combination of electrons and holes. The organic light emitting display has high response speed and is driven with low power consumption. However, when the organic light emitting display is driven at a high frequency, it can cause problems such as increased power consumption, deteriorated stability, and increased manufacturing costs.

SUMMARY

Accordingly, embodiments of the present invention provide for an organic light emitting display capable of being driven at a low driving frequency and a method of driving the same.

According to an exemplary embodiment of the present invention, a method of driving an organic light emitting display during frames is provided. The organic light emitting display includes pixels coupled to odd and even scan lines. The frames include first, second, third, and fourth frame periods. The method includes: sequentially supplying scan signals to the odd scan lines in the first and third frame periods; and sequentially supplying scan signals to the even scan lines in the second and fourth frame periods. The pixels are in a non-emission state in the first and third frame periods.

The pixels may be further coupled to odd and even emission control lines corresponding to the odd and even scan lines. The pixels may be in a non-emission state when emission control signals are supplied to the emission control lines.

When the scan signals are supplied to the odd scan lines, the emission control signals may be supplied to corresponding ones of the odd and even emission control lines.

After the scan signals are supplied to the even scan lines, the supplying of the emission control signals to the corresponding ones of the odd and even emission control lines may be stopped.

The emission control signals supplied to at least two of the emission control lines in an upper part of a display panel and to at least two of the emission control lines in a lower part of the panel may have a larger width than the emission control signals supplied to remaining ones of the emission control lines in a center part of the panel.

A width of the emission control signals may slowly increase or stay the same from the center part of the panel to the upper part and to the lower part of the panel.

The method may further include changing bit values of digital data signals supplied to pixels positioned in the upper part and the lower part of the panel.

The bit values of the digital data signals may change to compensate for loss of brightness when the emission control signals are set to have the larger width.

Left data signals may be supplied to correspond to the scan signals supplied in the first and second frame periods. Right data signals may be supplied to correspond to the scan signals supplied in the third and fourth frame periods.

In another exemplary embodiment of the present invention, an organic light emitting display is provided. The organic light emitting display includes pixels, a scan driver, and a data driver. The pixels are located at crossing regions of scan lines and data lines. The scan lines include odd and even scan lines. The pixels are configured to be driven during frames. Each of the frames includes first, second, third, and fourth frame periods. The scan driver is for sequentially supplying scan signals to the odd scan lines in the first and third frame periods, for sequentially supplying scan signals to the even scan lines in the second and fourth frame periods, and for supplying emission control signals to odd and even emission control lines corresponding to the odd and even scan lines so that the pixels are in a non-emission state in the first and third frame periods. The data driver is for supplying data signals to the data lines to correspond to the scan signals.

When the scan signals are supplied to the odd scan lines, the scan driver may be configured to supply the emission control signals to corresponding ones of the odd and even emission control lines.

After the scan signals are supplied to the even scan lines, the scan driver may be configured to stop supplying the emission control signals to the corresponding ones of the odd and even emission control lines.

The scan driver may be configured to supply the emission control signals to at least two of the emission control lines in an upper part of a display panel and to at least two of the emission control lines in a lower part of the panel to have a larger width than the emission control signals supplied to remaining ones of the emission control lines in a center part of the panel.

A width of the emission control signals may slowly increase or stay the same from the center part of the panel to the upper part and to the lower part of the panel.

The organic light emitting display may further include a data converter. The data converter is for changing bit values of digital data signals supplied to pixels positioned in the upper part and the lower part of the panel and for supplying the changed bit values to the data driver.

The data converter may be configured to change the bit values of the digital data signals to compensate for loss of brightness when the emission control signals are set to have the larger width.

The data driver may be configured to supply left data signals to correspond to the scan signals supplied in the first and second frame periods and to supply right data signals to correspond to the scan signals supplied in the third and fourth frame periods.

Corresponding ones of the odd and even emission control lines may be electrically coupled to each other.

Each of the pixels may include an organic light emitting diode (OLED), a pixel circuit, and a control transistor. The pixel circuit is for controlling an amount of current supplied to the OLED. The control transistor is coupled between the OLED and the pixel circuit. The control transistor is configured to turn off when the emission control signals are supplied to the emission control lines and to turn on when the emission control signals are not supplied to the emission control lines.

In organic light emitting display embodiments according to the present invention, and method embodiments of driving the same, 3D images may be displayed at a driving frequency of 120 Hz. In addition, since one of adjacent frames is set in a non-emission state, power consumption may be reduced or minimized.

BRIEF DESCRIPTION OF THE DRAWINGS

The accompanying drawings, together with the specification, illustrate exemplary embodiments of the present invention, and, together with the description, serve to explain aspects and principles of the present invention.

DETAILED DESCRIPTION

Figure 1:
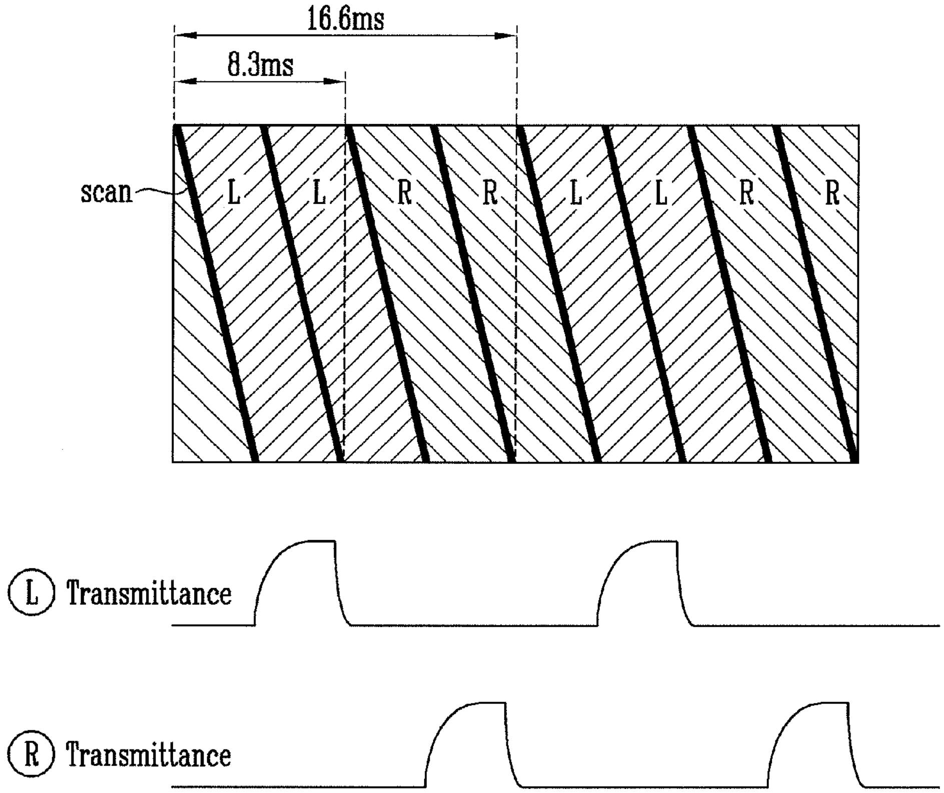
FIG. 1 is an illustration of a high-frequency frame period for displaying a 3D image.

Hereinafter, certain exemplary embodiments according to the present invention will be described with reference to the accompanying drawings. Here, when a first element is described as being coupled to a second element, the first element may be directly coupled (for example, connected) to the second element, or may be indirectly coupled (for example, electrically connected) to the second element via one or more third elements. Further, some of the elements that are not essential to a complete understanding of the embodiments of the invention may be omitted for clarity. In addition, like reference numerals refer to like elements throughout.

An embodiment of an organic light emitting display includes a plurality of data lines, a plurality of scan lines, a plurality of power lines, and a plurality of pixels arranged in a matrix at crossing regions of the data lines, the scan lines, and the power lines. Each pixel includes an organic light emitting diode (OLED), at least two transistors including a driving transistor, and at least one capacitor.

In this embodiment, the organic light emitting display is for displaying three-dimensional (3D) images in an alternate-frame sequenced manner by synchronizing the display of frames with a pair of shutter glasses (for example, liquid crystal shutter glasses). In this manner, the organic light emitting display processes four frames in a period of 16.6 milliseconds (ms), as illustrated in FIG. 1, in order to display a three-dimensional (3D) image. Among the four frames, two frames display a left image (that is, intended for the left eye) and the remaining two frames display a right image (for the right eye). A pair of shutter glasses receives light at (i.e., allows light to transmit through) a left glass in a partial period of a period where the left image is displayed, and receives light at a right glass in a partial period of a period where the right image is displayed. At this point, a person wearing the shutter glasses and watching the organic light emitting display recognizes the image supplied through the shutter glasses in 3D.

In this embodiment, however, in order to have the four frames included in the period of 16.6 ms, the organic light emitting display is driven at the driving frequency of 240 Hz. Driving the organic light emitting display at such a high frequency, though, can cause problems such as increased power consumption, deteriorated stability, and increased manufacturing costs.

Figure 2:
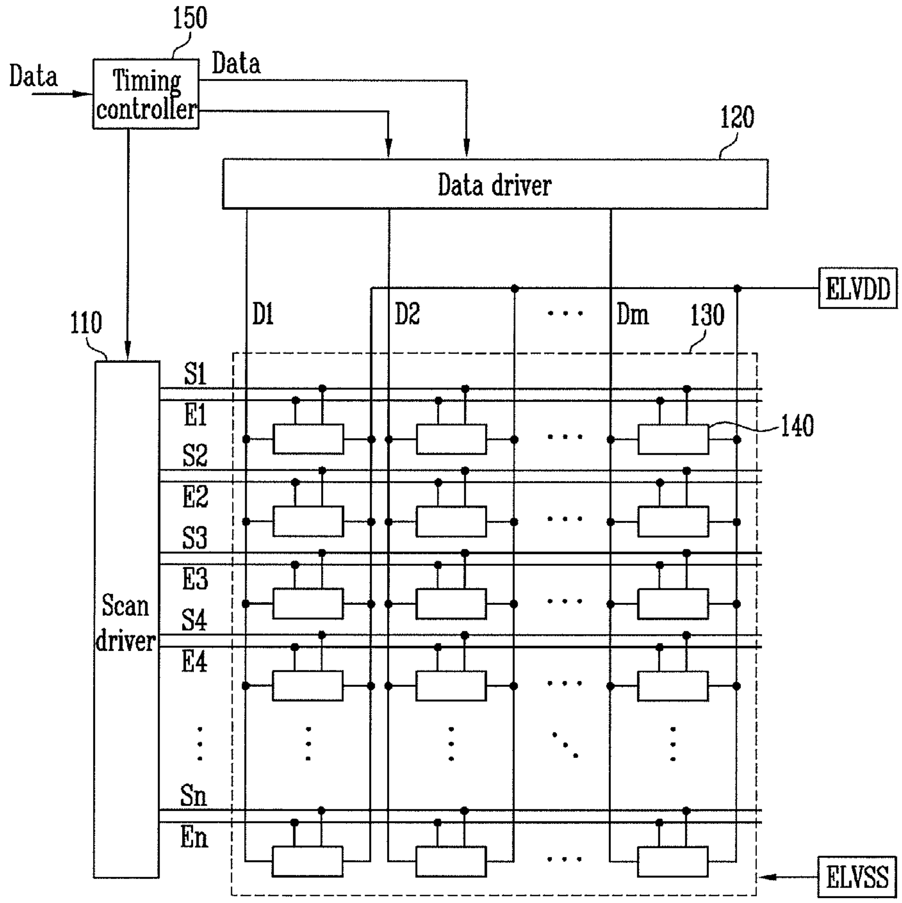
FIG. 2 is an illustration of an organic light emitting display according to a first embodiment of the present invention.
Figure 3:
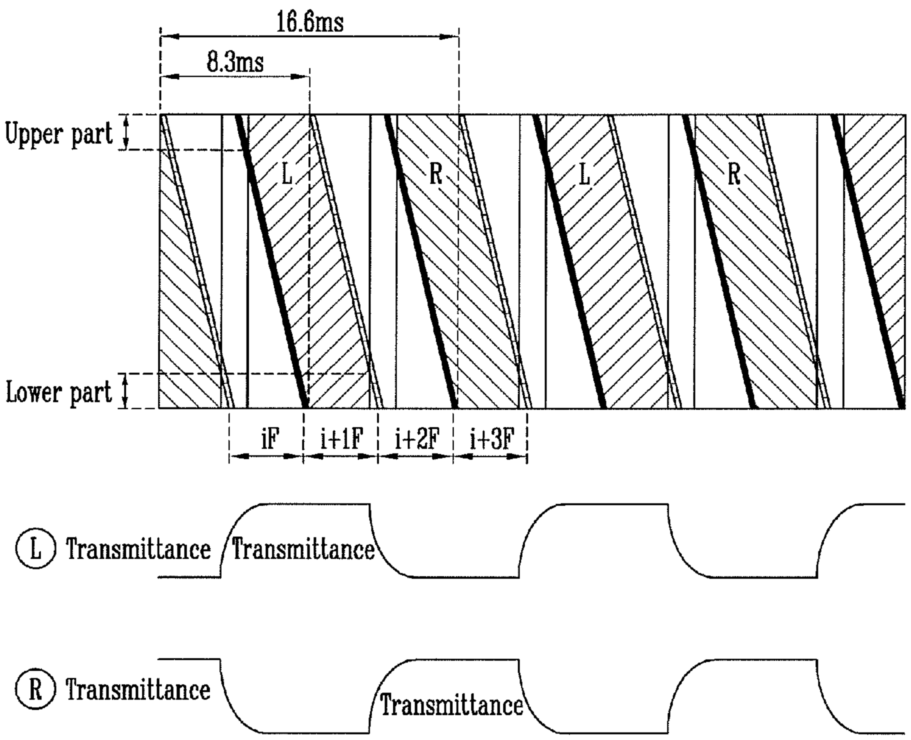
FIG. 3 is an illustration of a frame period for displaying a 3D image according to an embodiment of the present invention.

Hereinafter, exemplary embodiments of the present invention, by which those with ordinary skill in the art may practice embodiments of the present invention, will be described in detail with reference to FIGS. 2 to 7. FIG. 2 is an illustration of an organic light emitting display according to a first embodiment of the present invention. FIG. 3 is an illustration of a frame period for displaying a 3D image according to an embodiment of the present invention.

Referring to FIGS. 2 and 3, the organic light emitting display includes a display unit 130 including pixels 140 positioned at crossing regions of scan lines S1 to Sn and data lines D1 to Dm (as well as power lines coupled to a first power source ELVDD), a scan driver 110 for driving the scan lines S1 to Sn, a data driver 120 for driving the data lines D1 to Dm, and a timing controller 150 for controlling the scan driver 110 and the data driver 120. For example, the timing controller 150 may supply digital data signals (for example, bit data) Data to the data driver, which may in turn convert them to corresponding analog data signals to drive the data lines D1 to Dm.

Figure 4:
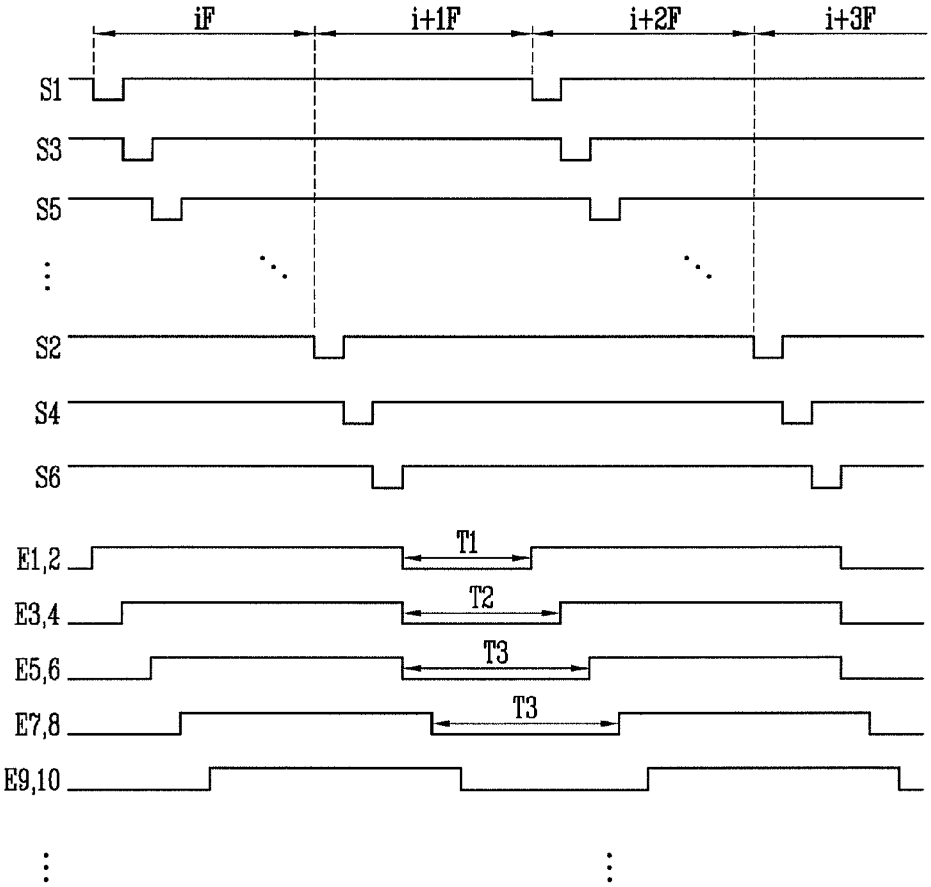
FIG. 4 is a waveform chart illustrating driving waveforms supplied by the scan driver of FIG. 2.

As illustrated in the driving waveforms of FIG. 4, the scan driver 110 sequentially supplies scan signals to the odd scan lines S1, S3, . . . or even scan lines S2, S4, . . . in the respective frame periods. For example, the scan driver 110 sequentially supplies the scan signals to the odd scan lines S1, S3, . . . in an ith (i is 1, 5, 9, . . . ) frame period iF (that is, a first frame period iF) and a (i+2)th frame period i+2F (that is, a third frame period i+2F), and sequentially supplies the scan signals to the even scan lines S2, S4, . . . in an (i+1)th frame period i+1F (that is, a second frame period i+1F) and an (i+3)th frame period i+3F (that is, a fourth frame period i+3F).

Further, the scan driver 110 sequentially supplies emission control signals to emission control lines E1 to En so that the pixels 140 are set in the non-emission state in the ith frame period iF and the (i+2)th frame period i+2F, where the scan signals are sequentially supplied to the odd scan lines S1, S3, . . . . Here, the scan driver 110 concurrently (for example, simultaneously) supplies emission control signals to a jth emission control line Ej and a (j+1)th emission control line Ej+1 (that is, to corresponding ones of the odd and even emission control lines) when the scan signals are supplied to the jth (j is 1, 3, 5, 7, . . . ) scan line Sj (that is, the even scan lines). Therefore, in the ith frame iF and the (i+2)th frame i+2F (that is, the first and third frame periods), all of the pixels 140 are set in the non-emission state.

In addition, the scan driver 110 sequentially stops the supply of the emission control signals in an (i+1)th frame period i+1F and an (i+3)th frame period i+3F, where the scan signals are sequentially supplied to the even scan lines S2, S4, . . . . For example, after the scan signal is supplied to the (j+1)th (j is 1, 3, 5, 7, . . . ) scan line Sj (that is, the even scan lines), the supply of the emission control signals to the jth emission control line Sj and the (j+1)th emission control line Sj+1 is stopped.

The data driver 120 supplies odd left data signals to the data lines D1 to Dm to correspond to the scan signals sequentially supplied to the odd scan lines S1, S3, . . . in the ith frame period iF and supplies even left data signals to the data lines D1 to Dm to correspond to the scan signals sequentially supplied to the even scan lines S2, S4, . . . in the (i+1)th frame period i+1F. In addition, the data driver 120 supplies odd right data signals to the data lines D1 to Dm to correspond to the scan signals sequentially supplied to the odd scan lines S1, S3, . . . in the (i+2)th frame period i+2F and supplies even right data signals to the data lines D1 to Dm to correspond to the scan signals sequentially supplied to the even scan lines S2, S4, . . . in the (i+3)th frame period i+3F.

The timing controller 150 controls the scan driver 110 and the data driver 120.

In the shutter glasses, light is received by the left glass (that is, transmitted through the left glass) from the organic light emitting display in the (i+1)th frame period i+1F, where the pixels 140 are set in an emission state. In a similar fashion, light is received by the right glass in the (i+3)th frame period i+3F. At this point, a person wearing the shutter glasses while watching a display driven in this fashion recognizes the image supplied through the shutter glasses in 3D.

On the other hand, as can be seen in FIG. 3 (in particular, the hatched regions alternately labeled L and R), the emission time of the pixels 140 positioned in the upper part and the lower part of the panel should be shorter than the emission time of the pixels 140 positioned in the other areas in the (i+1)th frame period i+1F and the (i+3)th frame period i+3F, considering the response speed of the shutter glasses. Otherwise, the glasses may exhibit a crosstalk phenomenon (that is, the intended image for one eye is still being displayed while the shutter glass for the other eye is transmitting light).

Therefore, as illustrated in FIG. 4, the width of the emission control signals supplied, for example, to the emission control lines E1, E2, E3, and E4 positioned at an upper part of the panel is larger (that is, the light emitting time is shorter) than the width of the emission control signals supplied to the emission control lines E5, E6, . . . , En-4 positioned in a center part of the panel. In a similar fashion, the width of the emission control signals supplied to the emission control lines En-3, En-2, En-1, and En positioned in a lower part of the panel is larger than the width of the emission control signals supplied to the emission control lines E5, E6, . . . , En-4 positioned in the center part of the panel.

When the emission time of the pixels 140 positioned in the upper and lower parts of the panel is controlled considering the response speed of the shutter glasses of the panel, a desired 3D image may be displayed without crosstalk. The number of emission control lines provided in the upper and lower parts of the panel may vary in consideration of the response speed of the shutter glasses. For example, at least two emission control lines may be provided in each of the upper and lower parts of the panel.

When the pixels included in the upper and lower parts of the panel are set to have shorter emission time compared to the pixels in the center part of the panel, brightness is reduced in the upper and lower parts of the panel as observed by a user. In order to prevent the brightness from being reduced, in an embodiment of the present invention, the widths of the emission control signals supplied to the emission control lines E1, E2, E3, and E4 provided in the upper part of the panel may be different from each other. For example, the emission control widths may be slowly reduced (or stay the same) toward the center of the panel (in other words, T3>T2>T1).

In a similar fashion, widths of the emission control signals supplied to the emission control lines En-3, En-2, En-1, and En included in the lower part of the panel may be slowly reduced toward the center of the panel. Then, the brightness of the pixels positioned in the upper and lower parts of the panel slowly deteriorates, which is not observed by a user.

According to the above-described embodiment, in the period of 16.6 ms, the ith frame iF, the (i+1)th frame i+1F, the (i+2)th frame i+2F, and the (i+3)th frame i+3F are included. Here, in the two-frame iF and i+1F as well as i+2F and i+3F frame periods, the scan signals are supplied to the scan lines S1 to Sn and the data signals are supplied to the data lines D1 to Dm to correspond to the scan signals supplied to the scan lines S1 to Sn. That is, in each of the two adjacent frames iF and i+1F as well as i+2F and i+3F, the data signals are supplied once to the pixels 140 so that the organic light emitting display may be effectively driven at the driving frequency of 120 Hz.

Furthermore, since the pixels 140 emit light only in the two frame periods i+1F and i+3F among the four frame periods iF to i+3F frames included in the period of 16.6 ms, power consumption may be reduced or minimized.

Figure 5:
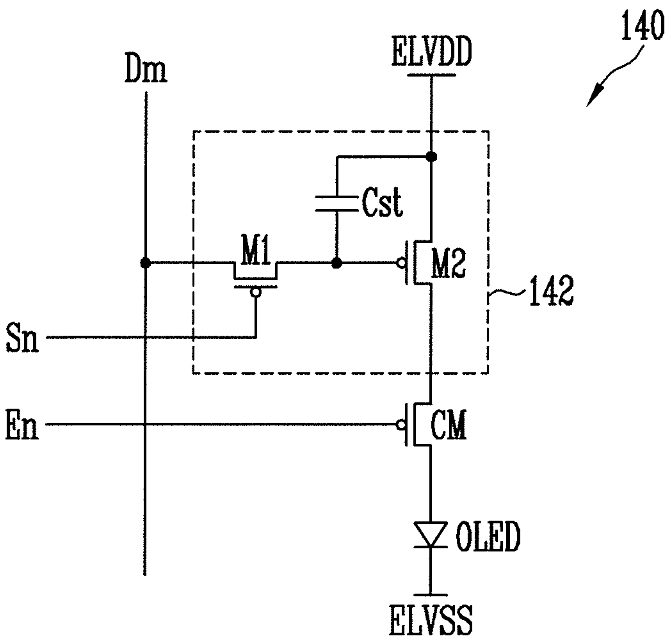
FIG. 5 is an illustration of the pixel of FIG. 2 according to an embodiment of the present invention.

FIG. 5 is an illustration of the pixel 140 of FIG. 2 according to an embodiment of the present invention.

Referring to FIG. 5, the pixel 140 includes an organic light emitting diode OLED, a pixel circuit 142 for controlling the amount of current supplied to the OLED, and a control transistor CM coupled between the pixel circuit 142 and the OLED.

An anode electrode of the OLED is coupled to the control transistor CM and a cathode electrode of the OLED is coupled to a second power source ELVSS. The OLED generates light with brightness (for example, a predetermined brightness) to correspond to the amount of current supplied from the pixel circuit 142.

The pixel circuit 142 controls the amount of current supplied to the OLED. The pixel circuit 142 may be formed of circuits of various types. For example, the pixel circuit 142 includes a first transistor M1, a second transistor M2, and a storage capacitor Cst. Each of the first transistor M1, the second transistor M2, and the control transistor CM includes a first electrode, a second electrode, and a gate electrode.

The first electrode of the first transistor M1 is coupled to a data line Dm and the second electrode of the first transistor M1 is coupled to the gate electrode of the second transistor M2. The gate electrode of the first transistor M1 is coupled to a scan line Sn. The first transistor M1 is turned on when the scan signal is supplied to the scan line Sn to electrically couple the data line Dm to the gate electrode of the second transistor M2.

The first electrode of the second transistor M2 is coupled to a first power source ELVDD and the second electrode of the second transistor M2 is coupled to the first electrode of the control transistor CM. The gate electrode of the second transistor M2 is coupled to the first electrode of the first transistor M1. The second transistor M2 supplies the current to the OLED corresponding to the voltage coupled to the gate electrode of the second transistor M2 to the OLED.

The storage capacitor Cst is coupled between the gate electrode of the second transistor M2 and the first power source ELVDD. The storage capacitor Cst charges a voltage corresponding to the data signal.

The first electrode of the control transistor CM is coupled to the pixel circuit 142 and the second electrode of the control transistor CM is coupled to the anode electrode of the OLED. The gate electrode of the control transistor CM is coupled to an emission control line En. The control transistor CM is turned off when the emission control signal is supplied to the emission control line En and is turned on when the emission control signal is not supplied.

Figure 6:
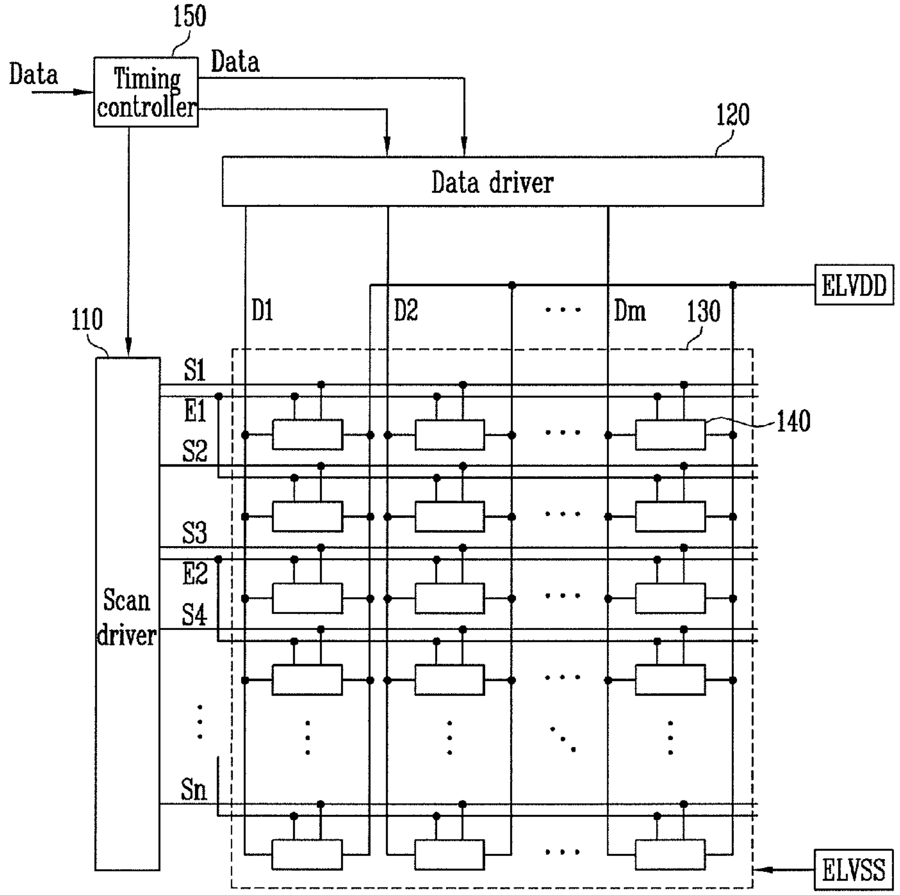
FIG. 6 is an illustration of an organic light emitting display according to a second embodiment of the present invention.

FIG. 6 is an illustration of an organic light emitting display according to a second embodiment of the present invention.

In the organic light emitting display of FIG. 6, each emission control line Ei of the emission control lines E1 to En/2 is coupled to the pixels 140 positioned on two horizontal lines (that is, to correspond to scan lines S2*i*−1 and S2*i*). This could be implemented, for example, by having the emission control line Ei extend between both the row of pixels in the (2i−1)th row and the row of pixels in the 2ith row, or (as shown in FIG. 6) by having the emission control line Ei extend along each of the (2i−1)th row and the 2ith row, the two extensions being electrically connected at one end (e.g., the right end, as shown in FIG. 6).

That is, as illustrated in FIG. 6, the pixels 140 positioned on the (2i−1)th horizontal line and the 2ith horizontal line receive the same emission control signal (from emission control line Ei). Therefore, in the embodiment of FIG. 6, the emission control line portions corresponding to the (2i−1)th horizontal line and the 2ith horizontal line are electrically coupled to each other to make up the ith emission control line Ei. In this case, the pixels 140 positioned in the (2i−1)th horizontal line and the 2ith horizontal line are coupled to the same emission control line Ei. Since the other structures and the driving method are the same as illustrated in FIG. 2, detailed description will not be repeated.

Figure 7:
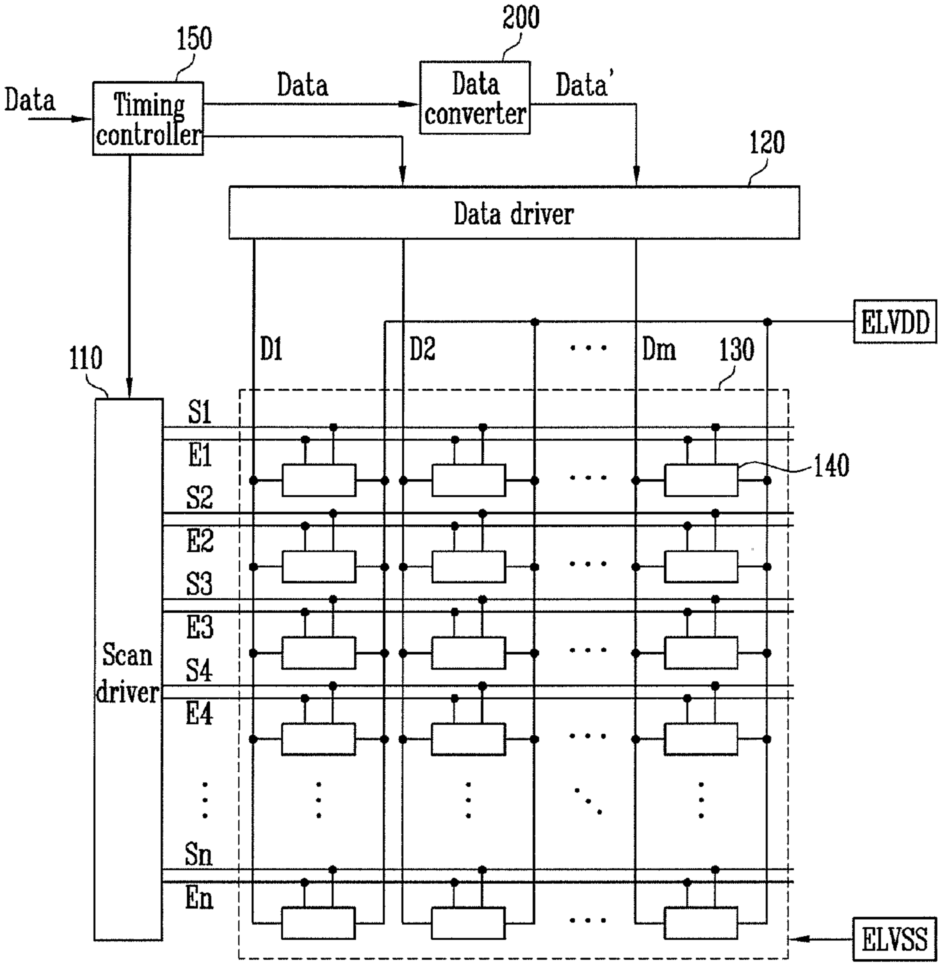
FIG. 7 is an illustration of an organic light emitting display according to a third embodiment of the present invention.

FIG. 7 is an illustration of an organic light emitting display according to a third embodiment of the present invention.

Referring to FIG. 7, the organic light emitting display according to the third embodiment of the present invention includes a data converter 200 positioned between the timing controller 150 and the data driver 120. The data converter 200 changes the bit values of the digital data signals Data to be supplied to the pixels 140 positioned in an upper part and a lower part of the panel to generate converted digital data signals Data'. The converted digital data signals Data' is set so that the brightness of the pixels 140 positioned in the upper part and the lower part of the panel may be compensated for.

Describing in detail, as illustrated in FIGS. 2 to 4, the emission control signals supplied to the emission control lines positioned in the upper part (for example, emission control lines E1, E2, E3, and E4) and in the lower part (for example, emission control lines En-3, En-2, En-1, and En) of the panel have a larger width than the emission control signals supplied to the emission control lines positioned in the center (for example, emission control lines E5, E6, . . . , En-4) of the panel. Without compensation, the brightness of the pixels 140 positioned at the upper part and the lower part of the panel may produce noticeable deterioration. Therefore, the data converter 200 changes the bit values of the digital data signals Data to generate the converted digital data signals Data' so that the pixels 140 positioned at the upper part and the lower part of the panel display the original (intended) brightness.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method of driving an organic light emitting display comprising pixels coupled to odd and even scan lines during frames, each of the frames comprising first, second, third, and fourth frame periods, the method comprising:

sequentially supplying scan signals to the odd scan lines in the first and third frame periods;

sequentially supplying scan signals to the even scan lines in the second and fourth frame periods; and either supplying left data signals to correspond to the scan signals supplied in the first and second frame periods; and supplying right data signals to correspond to the scan signals supplied in the third and fourth frame periods, or supplying the right data signals to correspond to the scan signals supplied in the first and second frame periods; and supplying the left data signals to correspond to the scan signals supplied in the third and fourth frame periods, wherein the pixels are in a non-emission state in the first and third frame periods.

2. The method as claimed in claim 1, wherein the pixels are further coupled to odd and even emission control lines corresponding to the odd and even scan lines, and the pixels are in a non-emission state when emission control signals are supplied to the emission control lines.

3. The method as claimed in claim 2, wherein, when the scan signals are supplied to the odd scan lines, the emission control signals are supplied to corresponding ones of the odd and even emission control lines.

4. The method as claimed in claim 3, wherein, after the scan signals are supplied to the even scan lines, the supplying of the emission control signals to the corresponding ones of the odd and even emission control lines is stopped.

5. The method as claimed in claim 1, wherein the left data signals are supplied to correspond to the scan signals supplied in the first and second frame periods, and wherein the right data signals are supplied to correspond to the scan signals supplied in the third and fourth frame periods.

6. A method of driving an organic light emitting display comprising pixels coupled to odd and even scan lines during frames, each of the frames comprising first, second, third, and fourth frame periods, the method comprising:

sequentially supplying scan signals to the odd scan lines in the first and third frame periods; and sequentially supplying scan signals to the even scan lines in the second and fourth frame periods, wherein the pixels are in a non-emission state in the first and third frame periods, the pixels are further coupled to odd and even emission control lines corresponding to the odd and even scan lines, the pixels are in a non-emission state when emission control signals are supplied to the emission control lines, and the emission control signals supplied to at least two of the emission control lines in an upper part of a display panel and to at least two of the emission control lines in a lower part of the panel have a larger width than the emission control signals supplied to remaining ones of the emission control lines in a center part of the panel.

7. The method as claimed in claim 6, wherein a width of the emission control signals slowly increases or stays the same from the center part of the panel to the upper part and to the lower part of the panel.

8. The method as claimed in claim 6, further comprising changing bit values of digital data signals supplied to pixels positioned in the upper part and the lower part of the panel.

9. The method as claimed in claim 8, wherein the bit values of the digital data signals change to compensate for loss of brightness when the emission control signals are set to have the larger width.

10. An organic light emitting display comprising:

pixels located at crossing regions of scan lines and data lines, the scan lines comprising odd and even scan lines, the pixels configured to be driven during frames, each of the frames comprising first, second, third, and fourth frame periods;

a scan driver for sequentially supplying scan signals to the odd scan lines in the first and third frame periods, for sequentially supplying scan signals to the even scan lines in the second and fourth frame periods, and for supplying emission control signals to odd and even emission control lines corresponding to the odd and even scan lines so that the pixels are in a non-emission state in the first and third frame periods; and a data driver for supplying left data signals and right data signals to the data lines to correspond to the scan signals by either supplying the left data signals to correspond to the scan signals supplied in the first and second frame periods, and supplying the right data signals to correspond to the scan signals supplied in the third and fourth frame periods, or supplying the right data signals to correspond to the scan signals supplied in the first and second frame periods, and supplying the left data signals to correspond to the scan signals supplied in the third and fourth frame periods.

11. The organic light emitting display as claimed in claim 10, wherein, when the scan signals are supplied to the odd scan lines, the scan driver is configured to supply the emission control signals to corresponding ones of the odd and even emission control lines.

12. The organic light emitting display as claimed in claim 11, wherein, after the scan signals are supplied to the even scan lines, the scan driver is configured to stop supplying the emission control signals to the corresponding ones of the odd and even emission control lines.

13. The organic light emitting display as claimed in claim 10, wherein the data driver is configured to supply the left data signals to correspond to the scan signals supplied in the first and second frame periods and to supply the right data signals to correspond to the scan signals supplied in the third and fourth frame periods.

14. The organic light emitting display as claimed in claim 10, wherein corresponding ones of the odd and even emission control lines are electrically coupled to each other.

15. The organic light emitting display as claimed in claim 10, wherein each of the pixels comprises:

an organic light emitting diode (OLED);

a pixel circuit for controlling an amount of current supplied to the OLED; and a control transistor coupled between the OLED and the pixel circuit and configured to turn off when the emission control signals are supplied to the emission control lines and to turn on when the emission control signals are not supplied to the emission control lines.

16. An organic light emitting display comprising:

pixels located at crossing regions of scan lines and data lines, the scan lines comprising odd and even scan lines, the pixels configured to be driven during frames, each of the frames comprising first, second, third, and fourth frame periods;

a scan driver for sequentially supplying scan signals to the odd scan lines in the first and third frame periods, for sequentially supplying scan signals to the even scan lines in the second and fourth frame periods, and for supplying emission control signals to odd and even emission control lines corresponding to the odd and even scan lines so that the pixels are in a non-emission state in the first and third frame periods; and a data driver for supplying data signals to the data lines to correspond to the scan signals, wherein the scan driver is configured to supply the emission control signals to at least two of the emission control lines in an upper part of a display panel and to at least two of the emission control lines in a lower part of the panel to have a larger width than the emission control signals supplied to remaining ones of the emission control lines in a center part of the panel.

17. The organic light emitting display as claimed in claim 16, wherein a width of the emission control signals slowly increases or stays the same from the center part of the panel to the upper part and to the lower part of the panel.

18. The organic light emitting display as claimed in claim 16, further comprising a data converter for changing bit values of digital data signals supplied to pixels positioned in the upper part and the lower part of the panel and for supplying the changed bit values to the data driver.

19. The organic light emitting display as claimed in claim 18, wherein the data converter is configured to change the bit values of the digital data signals to compensate for loss of brightness when the emission control signals are set to have the larger width.

* * * * *